United States Patent
Otsuka et al.

(10) Patent No.: US 10,946,867 B2
(45) Date of Patent: Mar. 16, 2021

(54) PROCESSING DEVICE AND VEHICLE CONTROL SYSTEM

(71) Applicant: Hitachi Automotive Systems, Ltd., Hitachinaka (JP)

(72) Inventors: Satoshi Otsuka, Tokyo (JP); Kohei Sakurai, Hitachinaka (JP); Tasuku Ishigooka, Tokyo (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 0 days.

(21) Appl. No.: 15/761,962

(22) PCT Filed: Oct. 21, 2016

(86) PCT No.: PCT/JP2016/081194
§ 371 (c)(1),
(2) Date: Mar. 21, 2018

(87) PCT Pub. No.: WO2017/086087
PCT Pub. Date: May 26, 2017

(65) Prior Publication Data
US 2018/0281816 A1    Oct. 4, 2018

(30) Foreign Application Priority Data
Nov. 16, 2015  (JP) .............................. JP2015-223583

(51) Int. Cl.
*B60W 50/029*   (2012.01)
*G06F 11/20*   (2006.01)
(Continued)

(52) U.S. Cl.
CPC ........... *B60W 50/029* (2013.01); *B60R 16/02* (2013.01); *B60W 50/0205* (2013.01);
(Continued)

(58) Field of Classification Search
CPC .................................................. B60W 50/029
See application file for complete search history.

(56) References Cited

U.S. PATENT DOCUMENTS 5,957,985 A * 9/1999 Wong .................. G06F 11/2035
701/29.2
7,630,807 B2 * 12/2009 Yoshimura ............... B60K 6/46
701/48
(Continued)

FOREIGN PATENT DOCUMENTS

EP         1227007 B1 *  4/2007  ......... B60R 16/0232
JP       2004-38766 A    2/2004
(Continued)

OTHER PUBLICATIONS

International Search Report (PCT/ISA/210) issued in PCT Application No. PCT/JP2016/081194 dated Jan. 13, 2017 with English translation (four (4) pages).
(Continued)

*Primary Examiner* — Michael A Berns
(74) *Attorney, Agent, or Firm* — Crowell & Moring LLP

(57) ABSTRACT

The purpose of the present invention is to provide a system such that functions of a vehicle control system can be quickly reconfigured. The present invention is a processing device connected to at least one processing device, wherein during a period in which the one processing device executes a control operation on the basis of a control program installed in the one processing device, the processing device acquires a substitute program for the control program. In another aspect, the present invention is an on-board control system equipped with multiple processing devices, wherein during a period in which one processing device among the multiple processing devices executes a control operation on the basis of a control program installed in the one processing
(Continued)

device, another processing device acquires a substitute program for the program in the one processing device.

5 Claims, 10 Drawing Sheets

(51) Int. Cl.
    *B60R 16/02*     (2006.01)
    *G06F 11/07*     (2006.01)
    *B60W 50/02*     (2012.01)
    *G07C 5/08*     (2006.01)

(52) U.S. Cl.
    CPC ...... *G06F 11/0739* (2013.01); *G06F 11/0781* (2013.01); *G06F 11/0793* (2013.01); *G06F 11/20* (2013.01); *G07C 5/0808* (2013.01); *B60W 2050/021* (2013.01); *B60W 2050/0297* (2013.01)

(56) References Cited

U.S. PATENT DOCUMENTS

| | | | |
|---|---|---|---|
| 8,042,008 B2 * | 10/2011 | Kuroda | G06F 11/0781 714/48 |
| 8,239,507 B2 * | 8/2012 | Nakagawa | H04N 7/17354 707/610 |
| 8,380,383 B2 * | 2/2013 | Preston | B60R 25/00 701/24 |
| 8,549,063 B2 * | 10/2013 | Nakagawa | H04N 7/17354 709/201 |
| 9,650,038 B2 * | 5/2017 | Yoshimura | B60K 6/46 |
| 9,891,688 B2 * | 2/2018 | Armbruster | G06F 1/3287 |
| 2007/0021847 A1 | 1/2007 | Hyodo et al. | |
| 2009/0172092 A1 | 7/2009 | Nakagawa et al. | |

FOREIGN PATENT DOCUMENTS

| | | |
|---|---|---|
| JP | 2007-34359 A | 2/2007 |
| JP | 2009-70135 A | 4/2009 |
| JP | 2009-157768 A | 7/2009 |
| JP | 2010-285001 A | 12/2010 |
| JP | 2014-49013 A | 3/2014 |
| WO | WO 2014/148003 A1 | 9/2014 |

OTHER PUBLICATIONS

Japanese-language Written Opinion (PCT/ISA/237) issued in PCT Application No. PCT/JP2016/081194 dated Jan. 13, 2017 (five (5) pages).

Extended European Search Report issued in counterpart European Application No. 16866089.2 dated Aug. 12, 2019 (14 pages).

* cited by examiner

VEHICLE CONTROL SYSTEM H/W CONFIGURATION

ECU H/W CONFIGURATION

ECU SOFTWARE MODULE CONFIGURATION

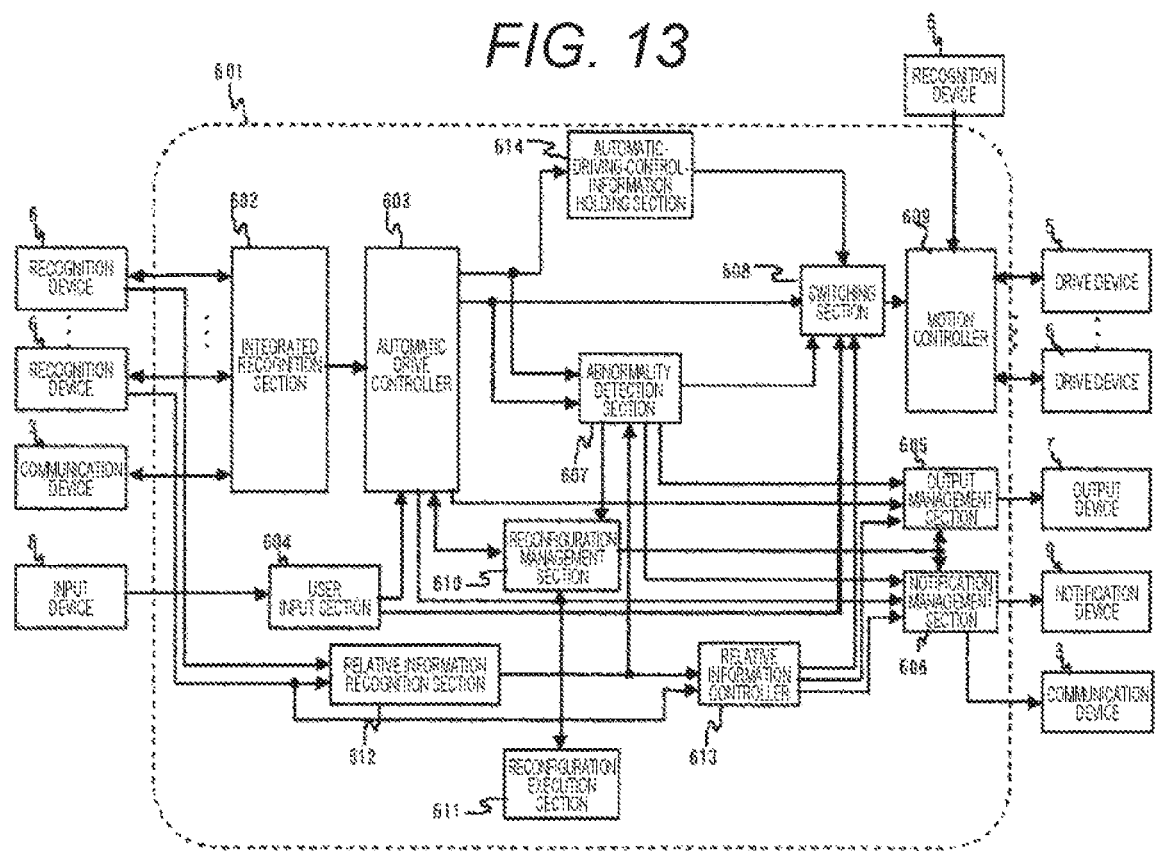
FIG. 13
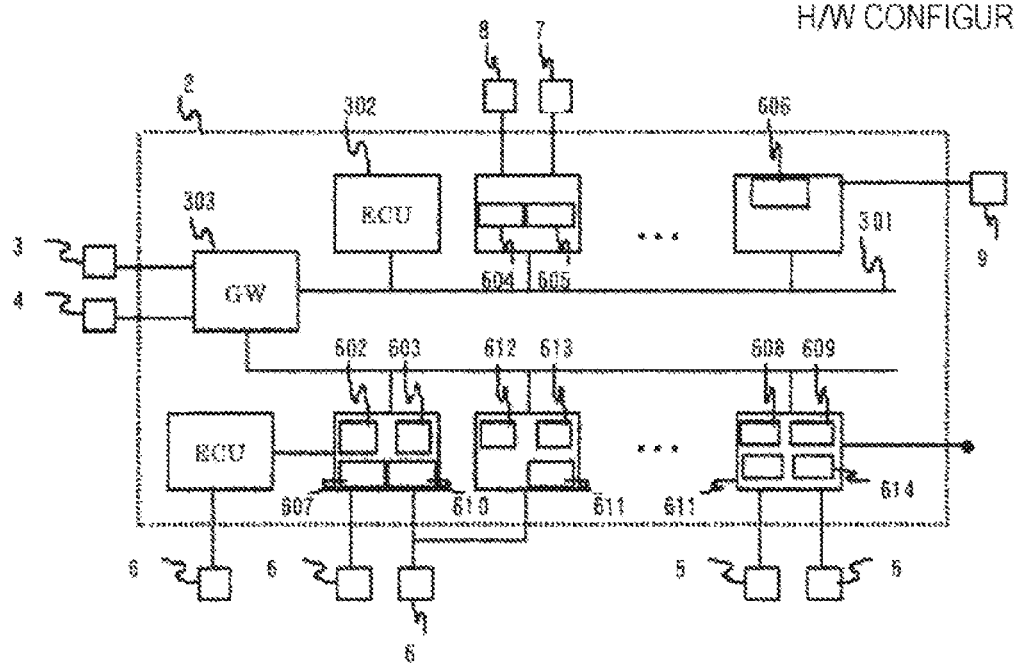
FIG. 14  VEHICLE CONTROL SYSTEM H/W CONFIGURATION

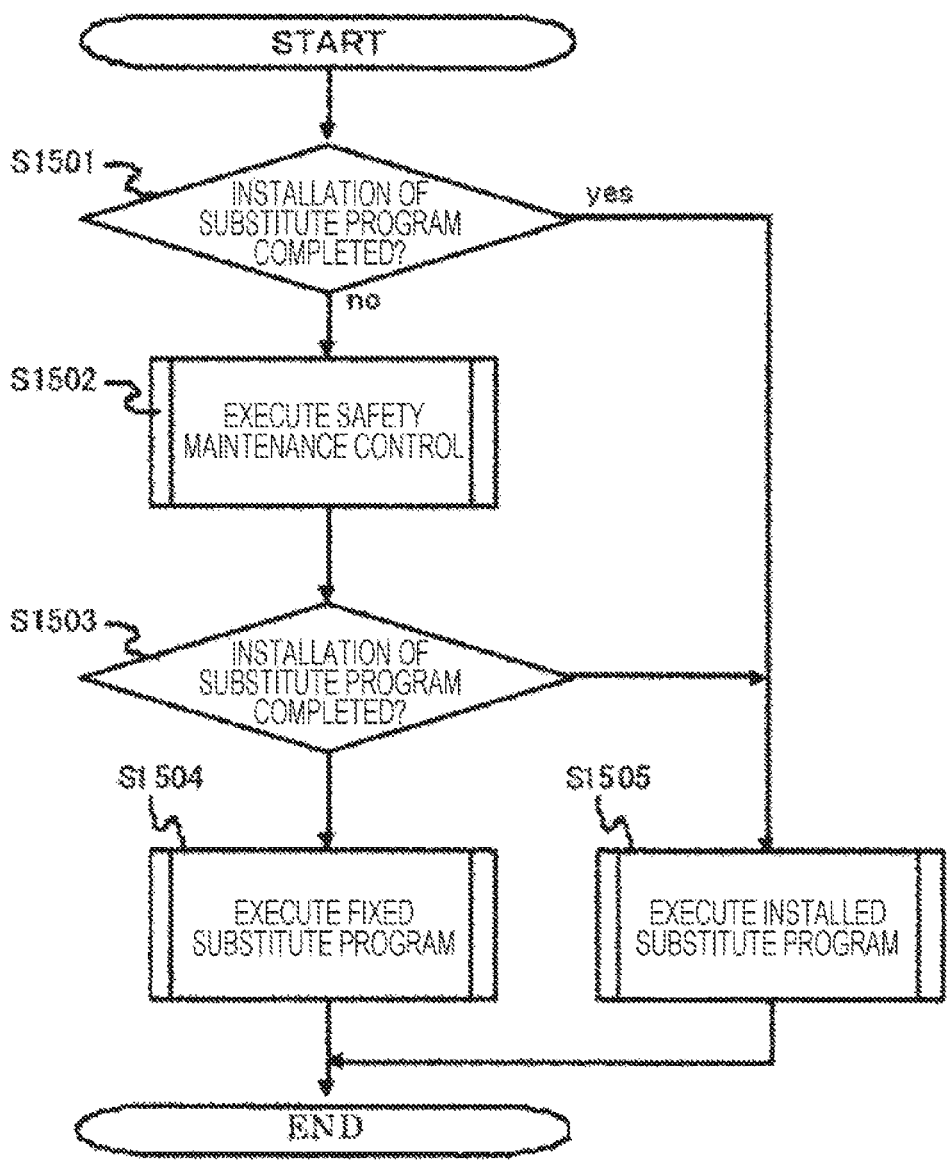

PROCESSING DEVICE AND VEHICLE CONTROL SYSTEM

TECHNICAL FIELD

The present invention relates to a processing device and a vehicle control system.

BACKGROUND ART

One of the background art of the present technical field is JP 2010-285001 A (PTL 1). The publication aims to "provide an electronic control system and a function substitute method capable of handling failures of the ECU without relying on a specific ECU". To solve this problem, the publication recites that "in an electronic control system 100 connecting a first electronic control unit 1 to at least one second electronic control unit A or B via a network 20, the first electronic control unit includes a failure detection means 36 that detects failures of own functions, and a substitute requesting means 35 that requests substitution of the failed function to the second electronic control unit, in which the second electronic control unit includes a determination means 42 that determines whether the substitution of the failed function is available, and substitution means 41 and 43 that substitute for the failed function if the availability of the substitution is determined."

Another document of the background art is JP 2014-49013 A (PTL 2). This publication aims to "guarantee functions assigned to a processor if an abnormality occurs in the processor in an electronic control system for a car including multiple processors". To solve this problem, the publication recites "in an electronic control system including processors A and B, store a program A and a RAM program A that implements a part of its function in a ROM of a memory A that is exclusively used by the processor A, while storing a program B and a RAM program B that implements a part of its function in a ROM of a memory B that is exclusively used by the processor B. At the start-up of the electronic control system, RAM program A of the processor A is transferred to and developed in the RAM of the processor B, while the RAM program B of the processor B is transferred to and developed in the RAM of the processor A. After that, if an abnormality occurs in one of the processors A and B, the other processor executes the RAM program and substitute the function assigned to the processor in which the abnormality has occurred."

CITATION LIST

Patent Literature

PTL 1: JP 2010-285001 A
PTL 2: JP 2014-43013 A

SUMMARY OF INVENTION

Technical Problem

Both documents of the background art described above recite reconfiguration of functions by assuming failure, and describe the examples of substituting the function by installing a substitute program (a program substituting the function or a program executing degenerating function) in the ECU in which the failure does not occur.

However, in the system in which successive operations of the function is required, such as the automatic driving system that has been studied recently, it is difficult to immediately execute the substitution of the function during travelling state according to the rewriting after the occurrence of the failure, which is recited in PTL 1, or the diagnosis before the start-up, which is recited in PTL 2. Therefore, it is desired to prevent a decrease in safety due to a sudden halt of the automatic driving function.

From another point of view, the functions, such as an automatic driving system, have been diversified and, accordingly, the safety control method during failure has also been diversified. It is also desired to achieve the optimized safety control according to the situation of failure.

The purpose of the present invention is to provide a system such that functions of a vehicle control system can be quickly reconfigured.

Solution to Problem

The present invention is a processing device connected to at least one processing device, in which during a period in which the one processing device executes a control operation in accordance with a control program installed in the one processing device, the processing device acquires a substitute program that substitutes for the control program.

Advantageous Effects of Invention

According to the embodiment of the present invention, the function of the vehicle control system can be quickly reconfigured.

BRIEF DESCRIPTION OF DRAWINGS

FIG. 13 illustrates a configuration example of a vehicle control system according to a second embodiment of the present invention.
FIG. 14 is an arrangement example of functions of the vehicle control system according to the second embodiment of the present invention.
FIG. 15 is an example flowchart of the system control during the occurrence of failure according to the second embodiment of the present invention.

DESCRIPTION OF EMBODIMENTS

Examples (embodiments) that are preferred to the present invention will be described below. The embodiments will mainly describe a vehicle control system in a vehicle system and a vehicle control device and, therefore, be preferably embodied in the vehicle system. However, such embodiments are not intended to preclude application of the embodiments to other systems.

First Embodiment

<Configuration of Vehicle Control System>

Figure 2:
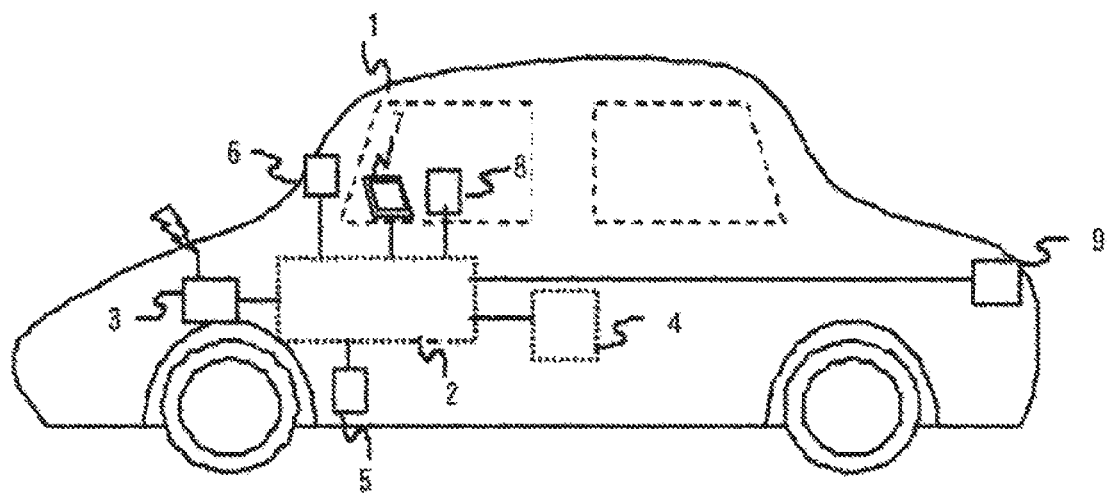
FIG. 2 illustrates a system example.

FIG. 2 illustrates an overall vehicle system including a vehicle system that includes a vehicle control system and a vehicle control device according to the present embodiment. A vehicle system 1 is a vehicle system, such as a car, that includes an internal vehicle control system. A vehicle control system 2 is a vehicle control system that includes an on-board network (e.g., a controller area network (CAN), a CAN with flexible data-rate (CANFD), or Ethernet (registered trademark)) and a controller such as an electronic control unit (ECU). A communication device 3 carries out wireless communication (e.g., mobile phone communication, communication using protocols, such as wireless LAN, WAN, C2X (car to X: vehicle-to-vehicle or vehicle-to-infrastructure communication) or global positioning system (GPS), with the outside of the vehicle system 1, in order to implement wireless communication for acquisition and transmission of information of the own vehicle or the outside (infrastructure, other cars, or a map), or carries out communication with the vehicle control system 2 with a diagnostic terminal (OBD), an Ethernet terminal, or a terminal for an external recording medium (e.g., a USB memory, an SD card, or the like). A vehicle control system 4 is a vehicle control system formed by a network using the same or different protocol as or from the protocol used in the vehicle control system 2. A drive device 5 is a drive device, such as an actuator, that drives machines and electrical apparatuses (e.g., an engine, transmission, wheels, brakes, or a steering wheel) that control the movement of the vehicle in accordance with the control by the vehicle control system 2. A recognition device 6 includes an external sensor, such as a camera, radar, LIDAR, or an ultrasonic sensor, that acquires information input from the outside and outputs information for creating outside recognition information which is describes later. The recognition device 6 also includes a recognition device formed of a dynamic system sensor that recognizes a state of the vehicle system 1 (e.g., a motion state, positional information, an acceleration rate, or a wheel speed). An output device 7 is an output device, such as a liquid crystal display, an alert lamp, or a speaker, that is connected to the network system in a wired or wireless manner to receive data sent from the network and display or output necessary information such as message information (e.g., video or sound). An input device 8 is, for example, a steering wheel, a pedal, a button, a lever, or a touch panel, that generates an input signal to enter a purpose of operation or an instruction to the vehicle control system 2 by a user. A notification device 9 is, for example, a lamp, an LED, or a speaker, for allowing the vehicle system 1 to notify the outside of a vehicle of the state or the like of the vehicle.

The vehicle control system 2 is connected to another vehicle control system 4, the wireless communication device 3, the drive device 5, the recognition device 6, the output device 7, the input device 8, the notification device 9, and the like to receive/transmit information from/to each device.

Figure 3:
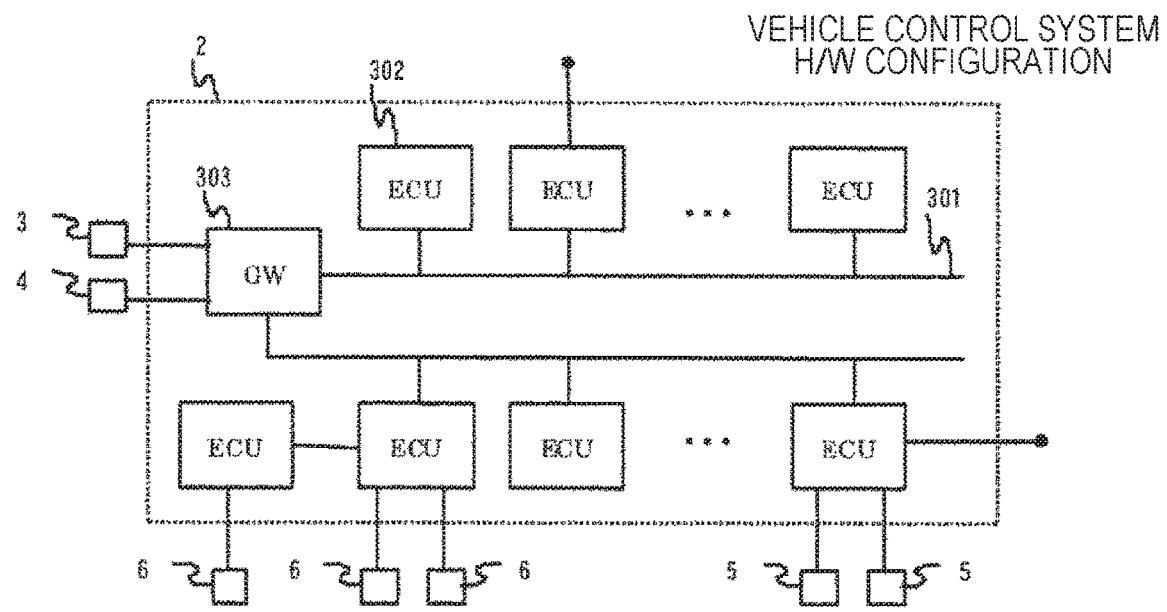
FIG. 3 illustrates a configuration example of a vehicle control system.

FIG. 3 illustrates a hardware (H/W) configuration of the vehicle control system 2. A network link 301 is a network link, such as a CAN bus, for connecting the network devices on the on-board, network. An electronic control unit (ECU) 302 is connected to the network link 301, the drive device 5, the recognition device 6, or a network link (including an exclusive line) other than the network link 301 to control and acquire information from the drive device 5 or the recognition device 6, and carry out data transmission/reception to/from the network. A gateway (GW) 303 is connected to multiple network links 301 to transmit/receive data to/from each network link.

Examples of a network topology include, in addition to a bus-type topology illustrated in FIG. 3 including multiple ECUs to two buses, a star-type topology in which the ECUs are directly connected to GW, a link type topology in which the ECUs are connected to the links in a ring shape, and a mixed type topology including the above-mentioned topology types and multiple networks. GW 303 and ECU 302 include an ECU having a GW function or a GW having an ECU function.

ECU 302 carries out, in accordance with the data received from the network, control processing such as outputting a control signal to the drive device 5, acquiring information from the recognition device 6, outputting a control signal and information to the network, or changing the internal state.

Figure 4:
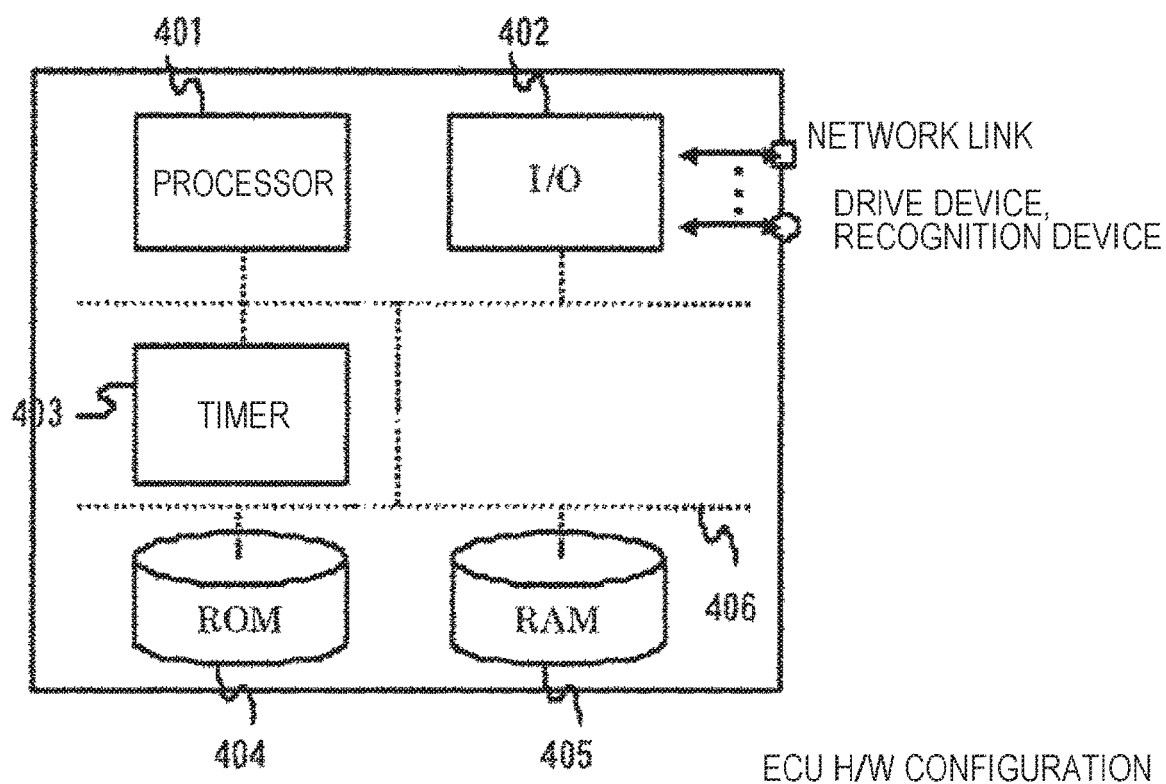
FIG. 4 illustrates a configuration example of a controller.

FIG. 4 illustrates an example of an internal configuration of the ECU 302 or GW 303, each provided as a network device according to the embodiment of the present invention. A processor 401, such as a CPU, includes a storage element such as a cache or a register and executes control. An input/output (I/O) 402 transmits/receives data to/from the network link 301, or the drive device 5 and/or the recognition device 6 which are connected via the network link 301, network, or a dedicated line. A timer 403 manages time intervals and time points using clock (not illustrated). A read only memory (ROM) 404 stores programs and involatile data. A random access memory (HAM) 405 stores programs and volatile data. An internal bus 406 is used for communication inside the ECU.

Figure 5:
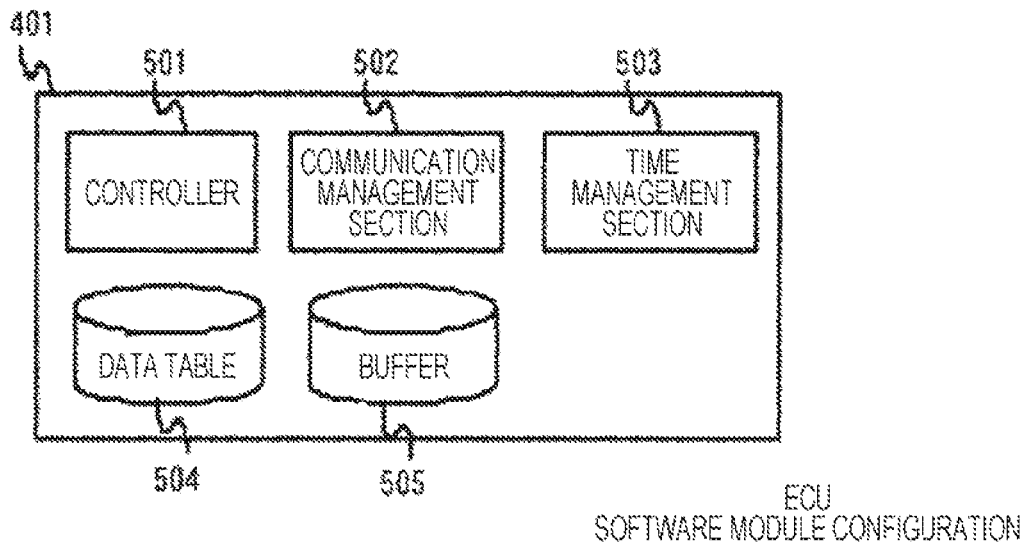
FIG. 5 illustrates a configuration example of a software module of the controller.

Next, a software module configuration operated in the processor 401 is illustrated in FIG. 5. A communication management section 502 manages the operation and state of the communication I/F 402 and provides an instruction to the communication I/F 402 via the internal bus 406. A time management section 503 manages a timer 403 to acquire information or control regarding time. A controller 501 analyzes data acquired from the communication I/F 402 or controls the entire software module. A data table 504 holds information necessary for vehicle control. A buffer 505 temporarily holds data.

The configuration of FIG. 5 described above illustrates an operational concept on the processor 401. The information necessary for operation is acquired from or written in the ROM 404 and the RAM 405, as appropriate, for operation.

The controller 501 executes functions of the vehicle control system which are described later.

<Configuration Example of Functions of Vehicle Control System>

Figure 6:
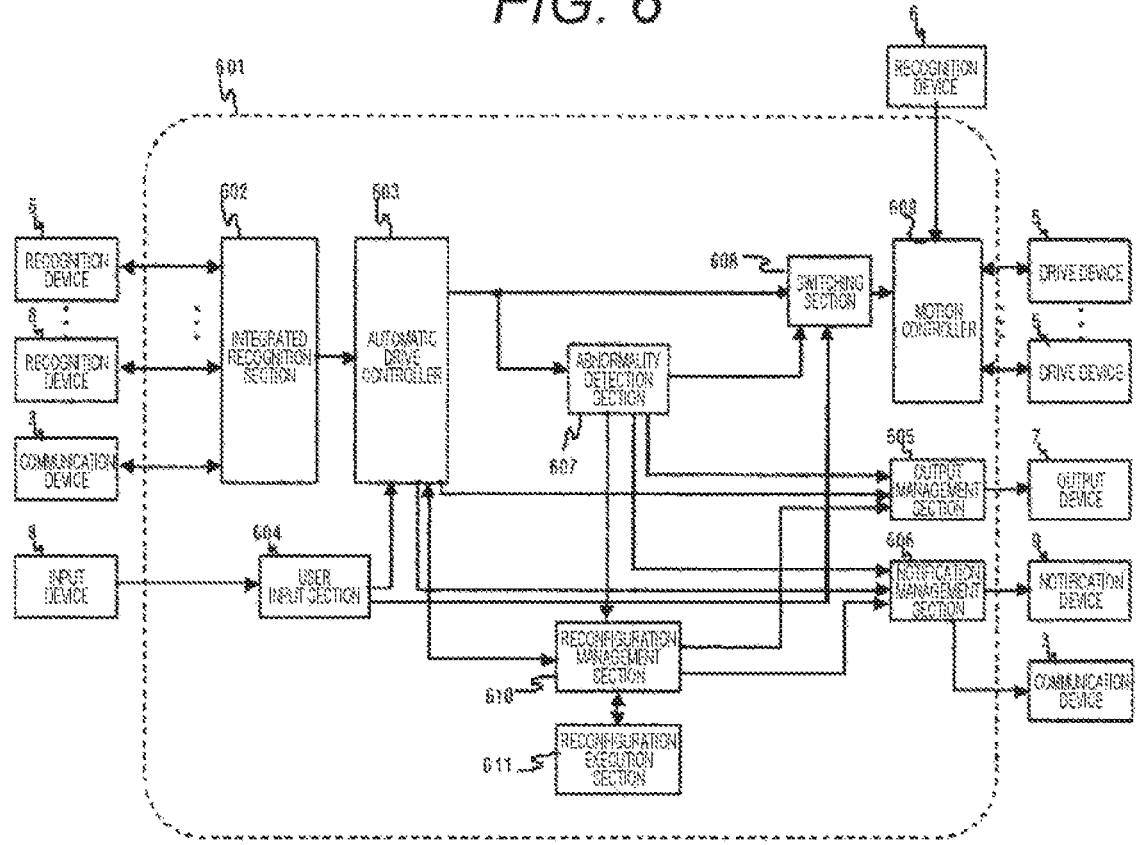
FIG. 6 illustrates a configuration example of a vehicle control system.

FIG. 6 illustrates a configuration example of functions of the vehicle control system. A vehicle control system 601 illustrates the entire vehicle control system according to the embodiment of the present invention. An integrated recognition section 602 creates an outside recognition map integrating outside recognition information output from multiple recognition devices 6 and the communication device 3. An automatic drive controller 603 generates and outputs automatic driving control information (e.g., a track) from the outside recognition map generated by the integrated recognition section 602 and the user input entered from a user input section 604. The automatic drive controller provides an output instruction to an output management section 605 and a notification instruction to a notification management section 606. The user input section 604 generates instruction information by the user in accordance with the input from the input device 8. The output management section 605 provides an output instruction to the output device 7 in accordance with the output of the automatic drive controller 603 and an abnormality detection section 607. The notification management section 606 provides a notification instruction to the notification device 9 in accordance with the output of the automatic drive controller 603 and the abnormality detection section 607. The abnormality detection section 607 detects an abnormality from the notification of automatic driving control information or the like from the automatic drive controller 603, or from the notification from individual elements which are not illustrated. A switching section 608 switches its output to a motion controller 609, in accordance with the abnormality detection result or the like of the abnormality detection section 607, to the input from the automatic drive controller 603 or the input from the user input section 604. A motion controller 609 controls the drive devices 5 in accordance with the track information or the motion control information from the switching section 608, the state of the vehicle system 1 acquired from the recognition device 6, and the response from the drive devices 5. A reconfiguration management section 610 receives the information from the automatic drive controller 603 and the notification from the abnormality detection section 607, acquires a substitute program, outputs the substitute program and an instruction to each element, and outputs the output to the user or the outside to the output management section 605 and the notification management section 606. A reconfiguration execution section 611 receives the instruction or the substitute program from the reconfiguration management section 610 to install and execute the substitute program, and provides a notification of the completion of installation.

The motion control information represents, for example, a target value of the motion control parameter, such as an acceleration rate or a yaw rate, a control command value to each drive device 5, and continuous values of these values in time series.

The vehicle control system may include some or all of the communication device 3, the drive device 5, the recognition device 6, the output device 7, the input device 8, and the notification device 9. In addition, the vehicle control device represents a device having a part of or the entire functions of the vehicle control system.

Figure 7:
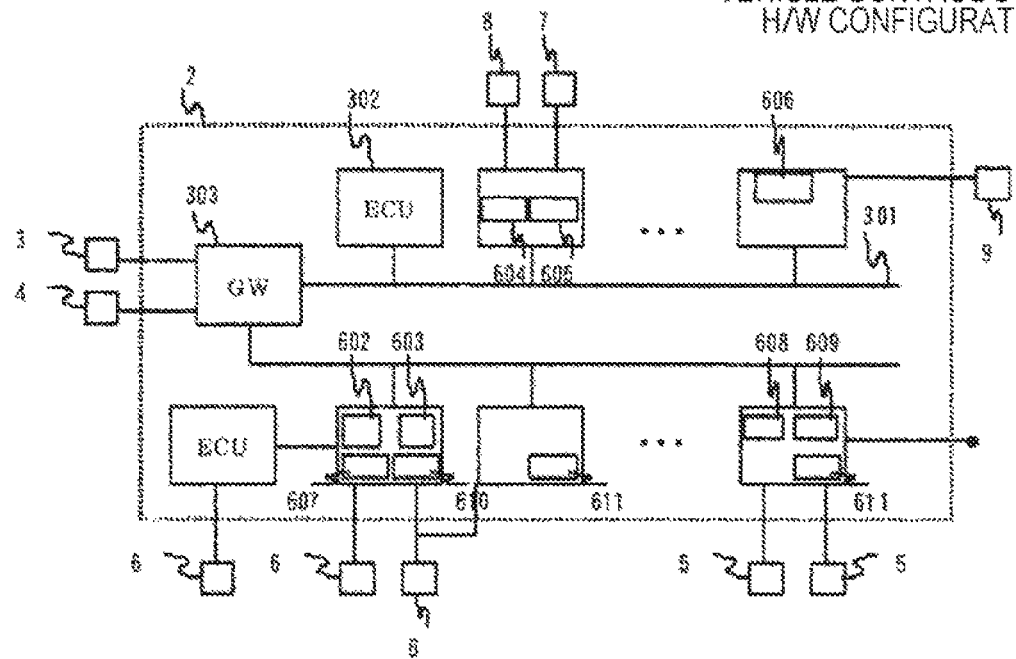
FIG. 7 illustrates an arrangement example of functions of a vehicle control system.

The vehicle control system 601 includes multiple functions, and multiple patterns are possible for the arrangement of the functions of the H/W illustrated in FIG. 3. FIG. 7 illustrates an arrangement example. The arrangement of the functions is not limited to this, and each function may be arranged in another ECU different from the illustrated ECU.

<Configuration of Reconfiguration Management Section>

Figure 8:
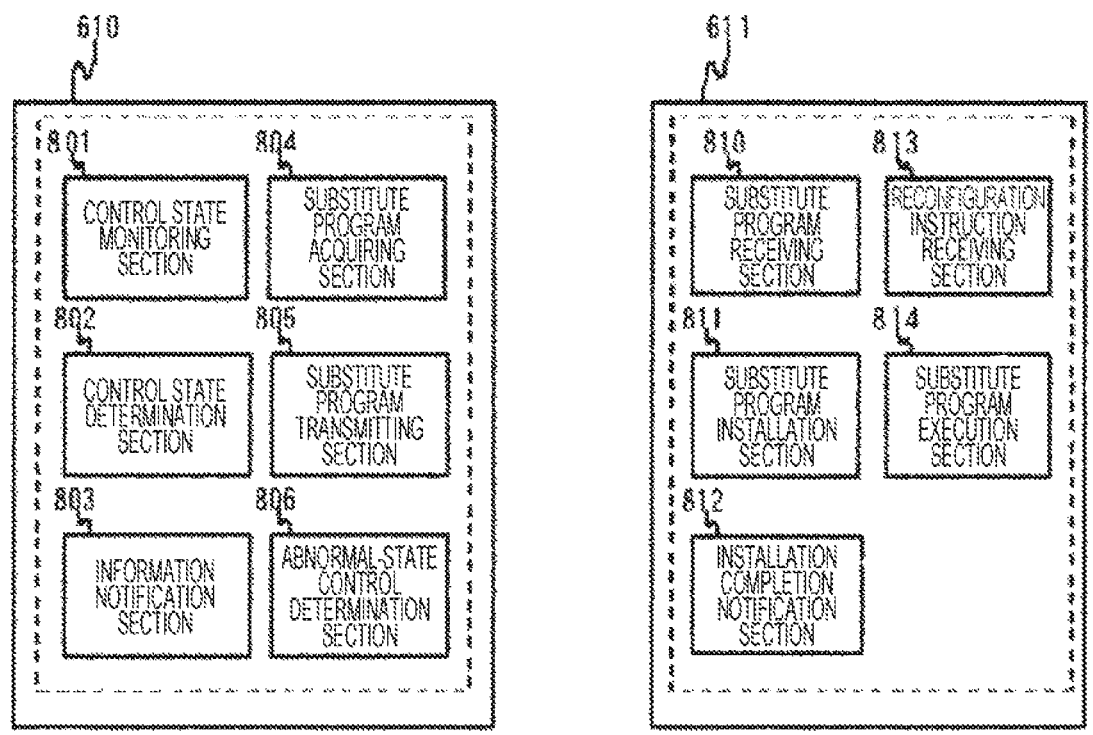
FIG. 8 illustrates functional examples of a reconfiguration management section and a reconfiguration execution section.

FIG. 8 illustrates detailed configurations of the reconfiguration management section 610 and the reconfiguration execution section 611. The reconfiguration management section 610 includes elements as described below. A control state monitoring section 801 receives the current vehicle control state from the automatic drive controller 603 or the like. A control state determination section 802 determines the current vehicle control state and determines the policy of reconfiguration as to which substitute program is installed to which one of the ECUs. An information notification section 803 notifies the output management section 605 or the notification management section 606 of the information regarding reconfiguration. A substitute program acquiring section 804 acquires the substitute program from the ECU in which the reconfiguration management section is arranged, or from a storage region (e.g., cloud, the ROM, the HDD, or the RAM) located at a different place via, for example, the network link 301 or the communication device 3. A substitute program transmitting section 805 transmits the substitute program. An abnormal-state control determination section 806 determines the control in an abnormal state according to an abnormal-state control determination method which will be described later.

The reconfiguration execution section 611 includes elements as described below. A substitute program receiving section 810 receives the substitute program transmitted from, for example, the reconfiguration management section 610. A substitute program installation section 811 installs the received substitute program in the storage region (e.g., a ROM or a RAM). An installation completion notification section 812 notifies the reconfiguration management section 610 or the like of the completion of installation of the substitute program in the storage region. A reconfiguration instruction receiving section 813 receives a substitute program receiving instruction or a substitute program execution instruction from the reconfiguration management section. A substitute program execution section 814 executes the substitute program installed in the storage region.

The elements in the reconfiguration management section 610 and the reconfiguration execution section 611 mutually communicate with each other to transmit or receive necessary information or instructions. Functional assignment of the reconfiguration management section 610 and the reconfiguration execution section 611 is not limited to this example. Alternatively, the substitute program, for example, may be acquired directly by the reconfiguration execution section 611, instead of being acquired by the reconfiguration management section 610. In this case, there is no need for the reconfiguration management section 610 to transmit/receive the substitute program, so that the processing load can be decreased.

In addition, more than one reconfiguration management section 610 and reconfiguration execution section 611 may be provided in the system. For example, the multiple reconfiguration execution sections 611 may be installed such that the function of an ECU, ECU_A, can be substituted for by not only ECU_B but also ECU_C and ECU_D and, while the function of the ECU_B can foe substituted for by the ECU_C. Thus, the function of an ECU can be substituted for by multiple ECUs and the functions of the ECUs can be substituted for simultaneously.

Further, the management of the substitution may be carried out intensively at one location by ECU_E, or in a distributed manner by ECU_E and ECU_F. This enables compensation of the function of the reconfiguration management, when partly failed, by another ECU, so that safety can be further ensured.

<Detection of Abnormality>

An abnormality detection method is described. As used herein, abnormality refers to an unexpected state that cannot be assumed in the normal time and caused by reasons such as hardware failures, software defects, or unexpected inputs. The elements of the vehicle control system 2 mutually communicate with each other via a network, an exclusive line, or the like. The abnormal communication may cause phenomena such that communication cannot be established (an error response in communication processing, an abnormal potential on the signal line), or a signal value for communication comes to an abnormal value. These communication abnormalities can be detected by detecting the abnormality with an electric circuit (e.g., to detect potential), regularly confirming living (heart beat), or detecting the error of an error detecting code such as CRC.

As to the failure of an arithmetic device, the abnormality can be detected by checking the result of the same calculation (comparison of the calculation result). A failure of the memory can be detected by detecting an error during the access to the RAM or ROM.

The defect of the software can also be detected from the abnormal range of the output result, other than by the comparison of the result of the same calculation.

The abnormality detection section 607 detects these abnormalities by itself or by receiving a notification of detection of abnormalities from individual elements. For example, the automatic drive controller 603 adds information indicating the occurrence of abnormality in any of the recognition device 6, the communication device 3, the integrated recognition section 602, or the communication among these elements, to the automatic vehicle control information and transmits the information. The abnormality detection section 607 receives the information and detects the occurrence of abnormality. According to the result of detection of the abnormality, the abnormality control such as the execution of a substitute program which is described later is carried out.

The abnormality detection section 607 notifies the output management section 605 and/or the notification management section 606 of the detection of abnormality. Thus, the output management section 605 outputs the vehicle state to a user, and/or the notification management section 606 creates a notification to the outside of the vehicle, which will be described later.

<Reconfiguration Processing Sequence>

Figure 1:
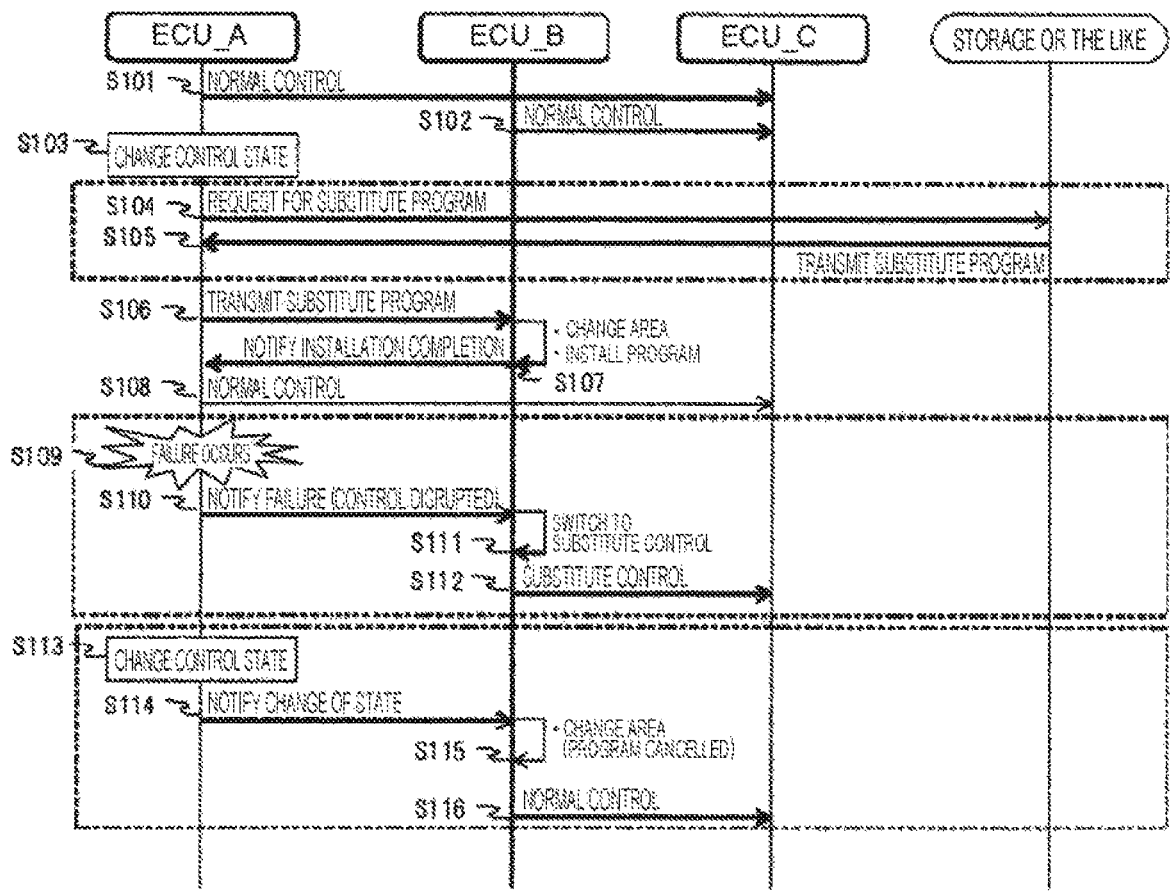
FIG. 1 is a sequence diagram of a vehicle control system according to a first embodiment of the present invention.

A processing sequence of reconfiguration processing according to the present embodiment is described by referring to FIG. 1. Herein, ECU_A includes the reconfiguration management section 610 and provides a reconfiguration instruction. In addition, ECU_A includes a control section (e.g., the automatic drive controller) in which the failure occurs. In this example, ECU_B includes the reconfiguration execution section 611 and ECU_C, which is the ECU executing substitute control, is controlled by ECU_A in the normal state.

In the normal state, ECU_A outputs a control signal to ECU_C (S101). In addition, ECU_B also outputs the control signal to ECU_C in the normal state (S102). When the vehicle continues travelling and the vehicle control state, which is described later, is changed as a result of the continuous travelling, the automatic drive controller 603 of ECU_A determines the change of the vehicle control state, and notifies the reconfiguration management section 610 of the change of the vehicle control state (S103). The reconfiguration management section 610 that has received the notification acquires a substitute program by itself. Alternatively, the reconfiguration management section 610 provides an instruction to output the substitute program to any one of the ECUs or a storage (S104). The substitute program is herein acquired from any one of the ECUs inside the vehicle system or a storage (e.g., HDD), or from the outside of the vehicle system via the communication device 3 or GW. Alternatively, the substitute program is previously held in the ECU, such as ECU_A, to which the function substitution is requested. ECU_A that has acquired the substitute program (S105) transmits the substitute program to ECU_B that carries out the function substitution during the failure (S106). ECU_B that has received the substitute program installs the substitute program, as in the example of FIG. 9 which is described later. When all programs have been received and installed, an installation completion notification is carried out (S107). ECU_A continues the normal control while carrying out management of the reconfiguration (S108).

Subsequently, when the failure occurs (S109), the abnormality detection section 607 in ECU_A, for example, detects the failure and notifies ECU_B of the occurrence of the failure. Alternatively, ECU_B detects the abnormality from the fact that the communication is disrupted (S110). ECU_B that has recognized the failure starts execution of the substitute program that has been held in ECU_B (S111). At this point, the control is taken over and ECU_B carries out substitute control on ECU_C (S112). The function substitution is carried out in this manner.

Meanwhile, if the vehicle control state is changed before the failure occurs (S113), the reconfiguration management section 610 receives the notification from the automatic drive controller 603 or the like in the same manner as described above, and notifies ECU_B of the change of state including information that the substitute program is unnecessary (S114). Upon receiving the notification of the change of state, ECU_B cancels the substitute program that has been held (S115). Subsequently, ECU_B carries out the normal control, if necessary (S116).

Thus, the program for substitute processing is previously installed in the ECU in accordance with the vehicle control state and, when the failure occurs, the program is immediately switched to the substitute program to ensure safety and convenience.

In this example, ECU_B carries out control in the normal state. Alternatively, the ECU may carry out control only when the failure occurs, and do not carry out control in the normal state. In this case, it is not necessary to cancel the program upon receipt of the notification of the change of state in S114, and there is no need to reinstall the program.

In this example, only ECU_B works as the ECU that substitutes the function. Alternatively, other ECUs may execute the substitute program by following the similar sequence. This ensures at least double backup for the failure when the failure occurs, thus improving reliability. Furthermore, the control may continue via a different path when the network is disconnected. In addition, the ECUs execute control independently in the substitute program, so that the load can be reduced.

Meanwhile, the substitute program can be changed in accordance with the vehicle control state. For example, in a situation where high safety is required (high-speed travelling, travelling on the highway, travelling on a crowded local road, automatic travelling with no map available, or a user being unconscious), a more advanced (e.g., a large data amount) substitute program is used and installed in the ECU that can achieve extensive safety (e.g., ASIL). In a situation where high safety is not required (low speed travelling, in the parking lot, or during monitoring by the user), the reconfiguration management section acquires the program in S105 and provides the reconfiguration instruction to the necessary ECU such that a simple substitute program can be installed in the ECU that can achieve a necessary safety level. This allows an appropriate substitute program to be executed in accordance with the control state.

Since the substitute program is transmitted simultaneously with the communication of the control information, it is desirable to lower the priority of communication for the substitute program. This allows the transmission of the reconfiguration information without largely interrupting the communication of the existing control information. The priority may not only be lowered, and it is desirable to set the priority higher than the communication that does not require the real-time characteristic (e.g., a signal for voice/message that is not used for the control, a signal of the air conditioner or the meter that has low priority). As a result, the reconfiguration can be completed relatively earlier, and the safety can be improved.

<Processing in ECU During Reconfiguration>

FIG. 9 illustrates the overall processing and memory images in ECU_B in the above example during the reconfiguration. (a) illustrates the state of the ROM and the RAM in the normal state. The ROM stores a control program, and the control program is executed by the CPU. In this example, the RAM stores MAIN data used in the normal state and SUB data not used in a specified control state.

Figure 9A:
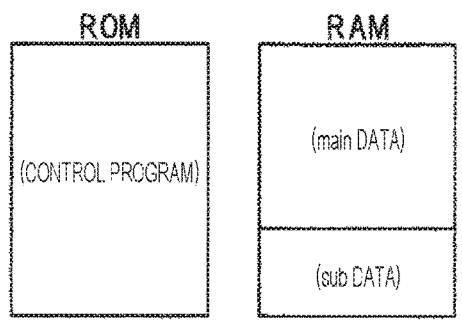
FIGS. 9A to 9E illustrate memory map examples when reconfiguration is executed.
Figure 9B:
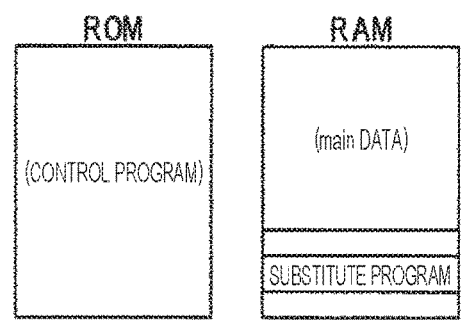

FIG. 9(b) illustrates the memory image in S107. A substitute program is installed in a region of the Sub data that is not used in the current control state. The substitute program is a relocatable module, and is desirably not in a format for accessing outside the own region or the reserved and ensured region of the RAM. This prevents illegal access to the data that is originally assumed to be used by ECU_B.

Figure 9C:
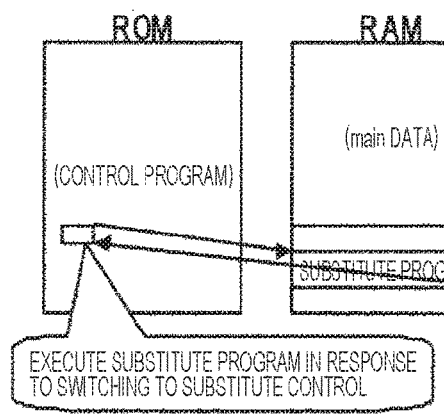

FIG. 9(c) illustrates switching of control in S111 in which a part of the control program in the ROM is switched to execute the substitute program. This enables execution of the substitute program.

Figure 9D:
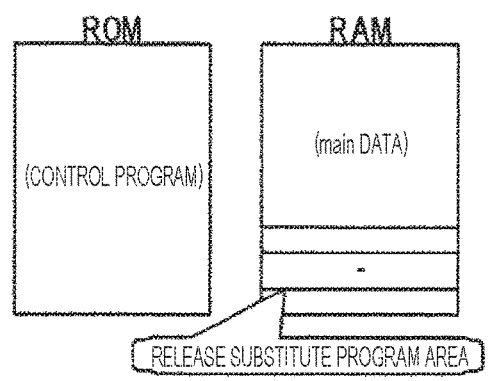

FIG. 9(d) illustrates a memory image in S115. The control state is changed, a region reserved with an internal flag or the like in the region where the substitute program has been installed is released, and the released region is set to the unused state.

Figure 9E:
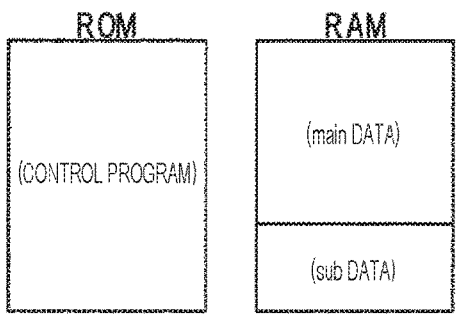

FIG. 9(e) illustrates an example of storing the data (Sub data) again in S116 in the RAM that has originally been used by ECU_B.

By previously storing the substitute program in the unused region according to the control state, the switching can be done quickly when the failure occurs.

In this example, the substitute program is stored in the RAM region that is changed according to the control state. Alternatively, a region of the RAM or the ROM that has not originally been used can be used. This eliminates cancellation of the program in S115 and installation of the program in S107 in the similar control state, and also eliminates the retransmission of the substitute program when the control state is changed.

<Vehicle Control State>

A vehicle control state refers to a state of control of the vehicle system. For example, the vehicle control state includes ON/OFF of the automatic driving state (OFF refers to the driver operation with the system assist or without the system control), travelling on a local road or the highway, ON/OFF during automatic parking, travelling speed (low-speed, medium-speed, high-speed), a state of the driver (capable of or difficult for driving operation), and a difficult state for automatic driving due to weather conditions (heavy rain, fog, backlight, an unmapped road, etc.).

In accordance with such vehicle control states, the ECUs that require the function substitution or the ECUs capable of function substitution are changed. For example, if the automatic parking is not carried out, the resources, such as the CPU, the ROM, or the RAM, that are necessary for implementing the function of automatic parking are made temporarily unnecessary, so that the substitute program can be installed in the unnecessary region. In another example, the local road is installed in the resource of the integrated recognition section or the automatic drive controller, which are not used during the automatic driving.

By changing the substitute program or the ECUs to be installed according to the vehicle control state and/or the required safety level, an optimized substitute control that suits to the vehicle control state can be executed.

<Output to User/Notification to Outside of Vehicle State>

The vehicle control system 2 outputs the current vehicle state to the user via the output device 7 or to the outside of the vehicle via the notification device 9 or the communication device 3. For example, if the abnormality occurs at any part of the vehicle system 1, an alert or the like is turned on or warning sound is generated to warn the user via the output device 7. Alternatively, the alert is output via the notification device 9 or the communication device 3 to the outside of the vehicle through, for example, the output of the alert state indicated by lamp, the alert sound from the speaker, or the output of the information regarding the abnormality.

When the abnormality is detected by the abnormality detection means described above, the occurrence of the abnormality is notified to the user by warning or the like or sound, and further, the contents of the abnormality (the elements where the abnormality has occurred, the communication path) are also indicated on the display of the output device 7 or by the alert lamp. Thus, the user can recognize the occurrence of the abnormality and proceed to taking over of the operation.

Similarly, the occurrence of the abnormality, the range of the abnormality, the direction of the tracks, and the like are notified to the outside of the vehicle via the notification device 9 or the communication device 3. This allows a car behind the car of interest, for example, to predict action of the vehicle system 2 in which the abnormality has occurred, and thus avoiding car crash or the like.

Figure 10:
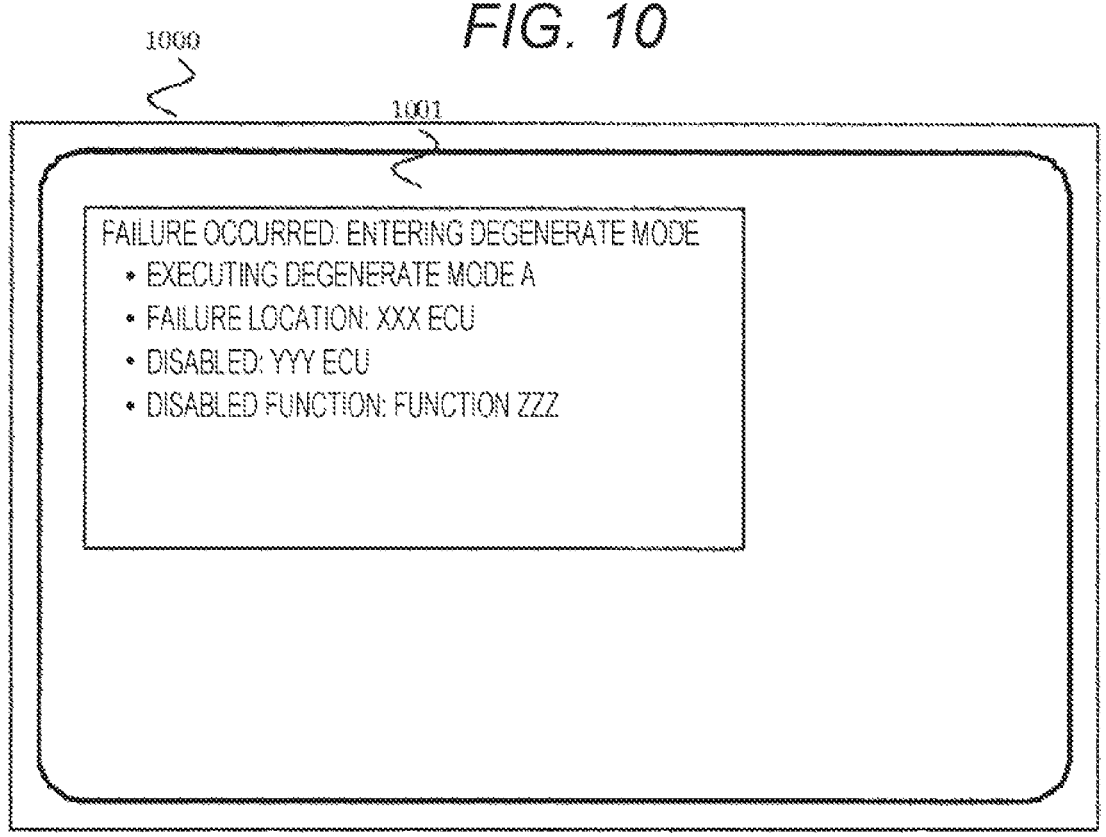
FIG. 10 illustrates an example of a display screen during reconfiguration.

FIG. 10 illustrates a display example to the output device 7. Herein, an entire display screen 1000 and an example message 1001 are illustrated. The contents of the message are received from the reconfiguration management section 610 or the abnormality detection section 607, including the name of the general description of the substitute program that is being executed, the location of the failure (an ECU or a microcomputer in the ECU, a RAM, a ROM, or an abnormal part), the unusable location (an ECU or a microcomputer in the ECU, a RAM, a ROM, or an abnormal part), and the function that becomes disabled according to the failure and unusable locations. The unusable location does not only refer to the location where the failure has actually occurred, but also the location that cannot be used because of, for example, disabled communication through the failure part. This allows the user to determine the current state of the vehicle control system 2 and proceed to carrying out the operation that suits to the failure, planning of not using the unusable function, or repair. Thus, the system can achieve improved convenience and safety.

<Take-Over Control by User>

An example of switching to the user control from the control in accordance with the automatic driving control information or the relative information is described. The user input section 604 detects a driving operation starting action of the user (e.g., stepping on the pedal, operating the steering wheel, or pushing the finishing button of the automatic driving) via the input device 8, and notifies the switching section 608 of such actions. Upon receipt of the notification of the driving operation start action of the user, the switching section 608 stops control that is based on the automatic driving control information and relative information, and switches to the user driving operation. Thus, the control that is based on the automatic driving control and the relative information is switched to the user driving operation.

<Abnormal-State Control Determination Method>

Figure 11:
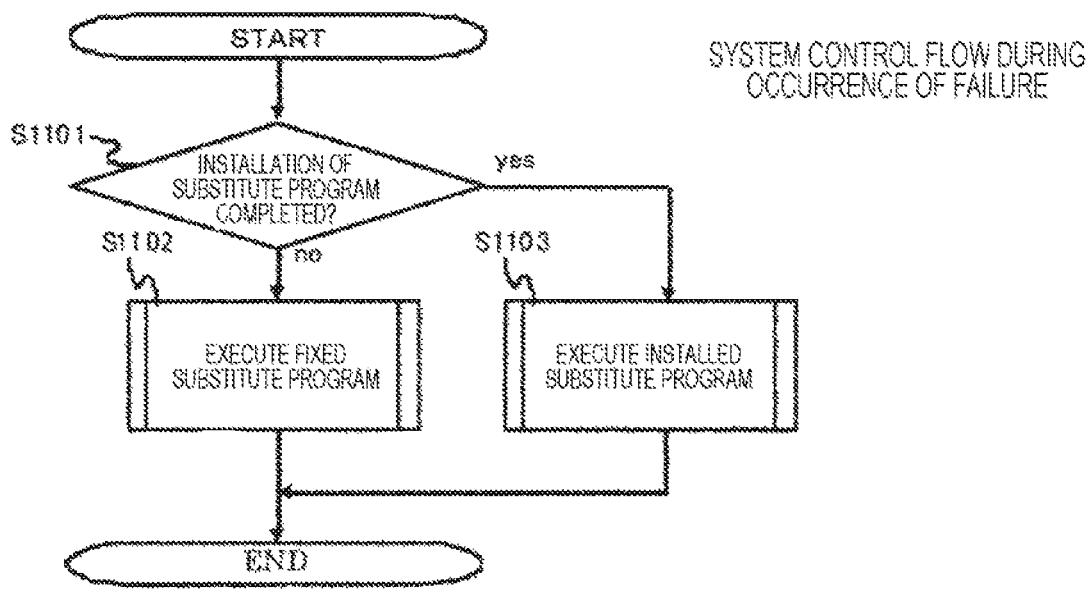
FIG. 11 is an example flowchart of system control during the occurrence of failure.
Figure 12:
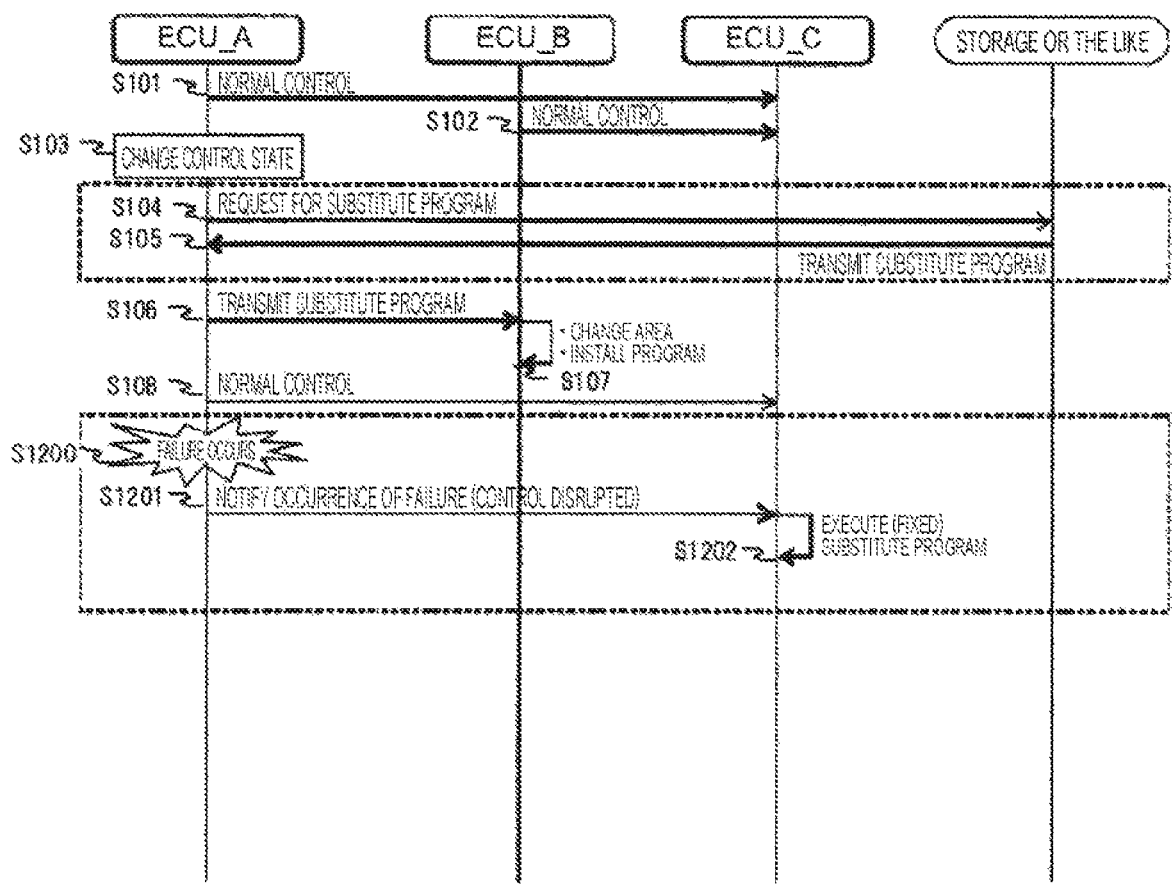
FIG. 12 illustrates a sequence diagram of the vehicle control system during failure when installation is not completed.

FIG. 11 illustrates a flowchart of the control in accordance with the installation state of the substitute program, and FIG. 12 illustrates the operation sequence diagram of the control. Assume herein that the installation of the substitute program to ECU_B has not been completed and the installation completion notification has not been issued in S107.

The flowchart of the control of the reconfiguration management section 610 during the occurrence of failure first confirms whether the installation of the substitute program has been completed by checking the receipt of the installation completion notification in the current vehicle control state. If the installation is completed (yes in S1103), the reconfiguration execution section 611 is instructed to execute the substitute program whose installation has been completed (S1103). If the installation is not completed (no in S1103), the reconfiguration execution section 611 or the ECU, which does not include the reconfiguration execution section 611 and is capable of executing a fixed substitute program, are instructed to execute the fixed substitute program.

A sequence example is also described by referring to FIG. 12. If the failure occurs in the state where the installation has not been completed (S1200), ECU_A detects the occurrence of failure and instructs execution of the fixed substitute program to ECU_C (S1201). When the execution is instructed, ECU_C executes the substitute program that has been previously held (S1202).

Thus, the fixed and different substitute program is executed even when the installation of the substitute program is not completed. This ensures at least the minimum safety. The fixed substitute program may be executed by ECU_D instead of ECU_C. When the execution is done by ECU_D, ECU_C does not have to execute unnecessary programs. Thus, the control program can be securely executed. In addition, the execution of the substitute program by ECU_C allows secure execution of the substitute program even when the trouble such as a trouble on the network occurs.

Second Embodiment

FIG. 13 illustrates a configuration example of the vehicle control system 2 of the present embodiment. The present embodiment additionally includes a relative information recognition section 612 that creates relative information, which is described later, in accordance with the information output from the recognition device 6, a relative information controller 613 that creates motion control information in accordance with the relative information and the information output from the recognition device 6, and an automatic-driving-control-information holding section 614 that holds and outputs, as needed, automatic driving control information.

The relative information refers to part of the outside recognition information that can be acquired particularly from the recognition device 6. The relative information is formed of a combination of any of information, such as a relative position, speed, or acceleration rate between a peripheral object and the own vehicle, or a value that can be calculated from the former values.

The motion control information represents, for example, a target value of the motion control parameter, such as an acceleration rate or a yaw rate, a control command value to each drive device 5, and continuous values of these values in time series.

The output management section 605 and the notification management section 606 receive the output of the relative information controller 613 to issue an output instruction and a notification instruction. The abnormality detection section 607 detects the abnormality in accordance with the information from the relative information recognition section 612. The switching section 608 switches the output to the motion controller 609, in accordance with the abnormality detection result of the abnormality detection section 607, to the input from the automatic drive controller 603, the user input section 604, the relative information controller 608, or the automatic-driving-control-information holding section 614.

FIG. 14 illustrates an arrangement example of functions of the H/W of the present embodiment. The arrangement of the functions is not limited to this, and each function may be arranged in another ECU different from the illustrated ECU. For example, the functions of the integrated recognition section 602, the automatic drive controller 603, the relative information recognition section 612, and the relative information controller 613 may be arranged in different ECUs or microcomputers. As a result, individual functions can be protected from the risk of failure caused by the common reason, i.e., the failure of the H/W, and achieve a high reliability.

The automatic drive controller 603 creates the automatic driving control information in accordance with the result of the peripheral recognition output from the integrated recognition section 602. An example of the automatic driving control information is the track. The track is generated to meet regulations of safety to enable safe travelling of the vehicle system (e.g., less likely to crash an obstacle), or regulations of motion, such as an acceleration or deceleration rate, or a yaw rate, that the vehicle system can achieve.

The track is represented by a group of coordinate positions of the own vehicle, for example, at fixed time intervals. In another example, the track can be represented by, for example, motion control values (the target acceleration rate or yaw rate) at fixed time intervals, vector values (orientation or velocity) of the own vehicle at fixed time intervals, or time intervals to travel a fixed distance.

As described above, the track is generated in accordance with the moving direction of the vehicle, the motion regulations, and the safety regulations. In accordance with the generated track, the automatic drive controller 603 transmits the track information to the motion controller 612 via the switching section 608. The motion controller 612 controls the drive device 5 in accordance with the track information. Thus, the vehicle system is controlled.

<Automatic Driving Control Information-Based Control>

The motion controller 609 controls the drive devices 5 to implement the automatic driving control information or the motion control information output from the switching section 608.

The automatic driving control information-based control is carried out in such a manner that, in a case where the automatic driving control information is, for example, the track, the target speed, yaw rate, and the like of the vehicle system 1 are calculated so as to follow the track by reflecting the system state of the vehicle system 1 (e.g., current speed, acceleration rate, or yaw rate) acquired from the recognition device 6. To implement the target speed and yaw rate, necessary drive devices 5 are controlled. Thus, the vehicle control capable of following the target track is realized.

To realize the control according to the motion control information, control operations such as increasing the output of the engine torque, controlling the brake for deceleration, rotating the steering wheel to attain the target yaw rate, or braking or accelerating the individual wheels to attain unequal wheel speed are carried out such that the target speed can be achieved. The drive devices 5 are controlled using the control value if the motion control information is the control value of drive devices 5. Thus, the target motion control is realized.

<Holding of Automatic Driving Control Information>

The automatic-driving-control-information holding section 614 holds previously-calculated results of automatic driving control information capable of ensuring the minimum safety when the abnormality occurs (e.g., automatic driving control information calculated in advance for a fixed time interval ahead by the automatic drive controller 603, travelling along the traffic lane, travelling along the traffic lane and gradually decelerating, or pulling over to the road shoulder, and hereinafter referred to as control information that has been held). When the abnormality occurs, the automatic-driving-control-information holding section 614 then switches to any one of the previously-held control information.

The automatic drive controller 603 transmits the calculated control information that has been held to the automatic-driving-control-information holding section 614. In the transmission, the abnormality detection section 607 also detects the presence of abnormality in the control information that has been held.

The switching section 608 switches the control information among the control information from the automatic drive controller 603, the relative information controller 613, and the automatic-driving-control-information holding section 614, and outputs the switched control information to the motion controller 609.

Thus, the control can continue for a fixed time interval with the control information that has been held, is capable of maintaining safety, and with no abnormality having been detected, when the abnormality occurs in the automatic driving control information. After that, if the abnormality is detected in the relative information, the control can be switched to the control with the secured relative information.

<Relative Information-Based Control>

An example of the relative information-based control is described. The relative information controller 613 creates the motion control information in accordance with the relative information output from the relative information recognition section 612 and the state of the own vehicle acquired from the recognition device 6.

An example in which an object (vehicle) exists ahead of the own vehicle is described. When the vehicle exists ahead of the own vehicle so that the relative position (distance) in the relative information decreases below a fixed value, the own vehicle is subjected to decelerating control. Accordingly, the relative information controller 613 determines the state of the own vehicle acquired from the relative information and the recognition device 6, and outputs the motion control information to enable deceleration to the switching section 608. In contrast, if the relative position exceeds the fixed value, the motion control information enabling the acceleration to the own vehicle is output in a similar manner. Thus, the acceleration or deceleration control is carried out such that the relative position relative to the vehicle travelling ahead of the own vehicle does not exceed or fall below the fixed amount. If the object exists behind the own vehicle, the control is similarly carried out so as to prevent the relative position from exceeding or falling below the fixed amount. Thus, the relative information-based control can be carried out by the determination and acceleration/deceleration control.

In addition, not only the front-back direction but also the left-right direction can also be recognized from the relative position. The steering wheel is operated toward the direction in which no object exists to avoid car-crash in, for example, the front-back direction. The target yaw rate for achieving the above object is also included in the motion control information, and the relative information controller 613 outputs to the switching section 608.

<Reconstruction Processing in Safety Maintenance Control State>

FIG. 15 illustrates an example flowchart of the system control of the reconfiguration management section during the failure when the control in accordance with the control information having been held or the relative information (hereinafter referred to as safety maintenance control) is carried out.

First, when the occurrence of failure is detected, the reconfiguration management section 610 confirms whether the installation of the substitute program has been completed by checking the receipt of the installation completion notification in the current vehicle control state. If the installation is completed (yes in S1501), the reconfiguration execution section 611 is instructed to execute the substitute program whose installation has been completed (S1505). If the installation is not completed (no in S1501), the safety maintenance control is carried out. After the processing is carried out for a fixed time interval, it is confirmed again whether the installation of the substitute program is completed (S1503). If the installation is completed (yes in S1501), the reconfiguration execution section 611 is instructed to execute the substitute program whose installation has been completed (S1505). If the installation is not completed (no in S1501), the reconfiguration execution section 611 is instructed to execute the fixed substitute program. Thus, the safety can be ensured by the safety function maintenance when the installation of the substitute program is not completed. Subsequently, when the installation is completed, the substitute program is executed. If the installation remains uncompleted, the fixed program is executed. This increases opportunity of executing the substitute program to achieve the improved security.

Herein, the transmission and installation of the substitute program continues while the safety maintenance control is executed in S1502. Alternatively, to quickly finish the installation, a higher priority may be assigned to the communication of the substitute program to speed up the installation.

In addition, there is a communication bandwidth not being used due to the occurrence of failure, and such a bandwidth may be used. Thus, the installation can be completed faster during the execution of the safety maintenance control, and the installed substitute program can be more likely executed.

If the installation is completed during the execution of the safety maintenance control in S1502, the execution may be switched to the execution of the substitute program installed at the time of receiving the installation completion notification. Thus, the execution time of the safety maintenance control can further be decreased.

Meanwhile, if the reconfiguration management section 610 determines that the safety maintenance control can achieve higher safety than the substitute program that can be executed currently, the safety maintenance control may have a higher priority than the priority of the execution of the installed substitute program. In this case, S1501 becomes unnecessary. This also enables control with further improved safety.

Figure 16:
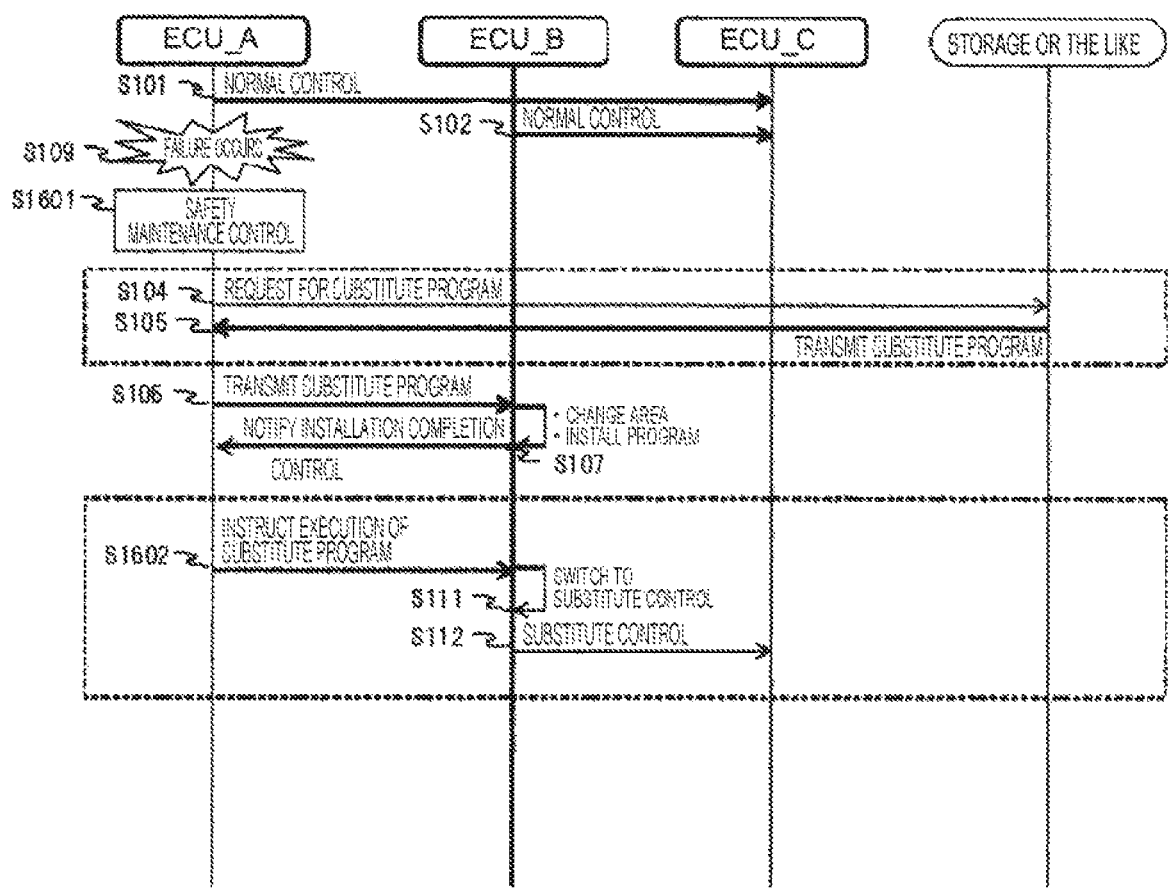
FIG. 16 illustrates a sequence diagram of the vehicle control system according to the second preferred embodiment of the present invention.

The installation of the substitute program may be started while the safety maintenance control is carried out after the failure has occurred. FIG. 16 illustrates an example sequence diagram. After the failure occurs (S109), ECU_A instructs execution of the function maintenance control (S1601), while the substitute program is installed (S104 to S107). Subsequently, at timing when the safety maintenance control is finished, or the installation of the substitute program is completed, the substitute program is executed (S1602). Thus, the substitute program can be installed in accordance with the failure state, in addition to the vehicle control state. Further, the installation of the substitute program is unnecessary if no failure occurs. Thus, the load of the installation processing and the communication processing can be reduced.

In the embodiment described above, the substitute program for reconfiguration can be installed previously at the time when the vehicle control information is switched, and the control is switched to the control with the substitute program when the failure occurs. This decreases time taken till the reconfiguration is completed and provides the substitute program with variable contents. This improves convenience, safety, and usability of the system.

In particular, the substitute program includes variable contents and variable installation locations (ECUs) according to the vehicle control state. This leads to achieving of the safety control in accordance with the vehicle control state and the optimized usage of the resource of the vehicle control system.

In addition, the fixed substitute program is executed when the installation of the substitute program is not completed. This ensures the minimum security.

In another embodiment, the safety maintenance control is carried out and the substitute program is installed during the control when the failure occurs in the automatic driving control state. This further improves security and convenience.

In particular, for example, the safety maintenance control may be carried out after the failure has occurred and, at the same time, the priority of transmission of the substitute program is raised. This allows execution of the substitute program more safely in accordance with the control state.

Further, the safety maintenance control is carried out and the substitute program is installed after the failure has occurred, so that the substitute program can be installed in accordance with the failure state. This further improves safety and convenience. Further, the installation of the substitute program is unnecessary if no failure has occurred, so that the load of the installation processing and the communication processing can be reduced.

REFERENCE SIGNS LIST 1 vehicle system
2 vehicle control system
3 communication device
4 vehicle control system
5 drive device
6 recognition device
7 output device
8 input device
9 notification device
301 network link
302 ECU
303 GW
401 processor
402 I/O
403 timer
404 ROM
405 RAM
406 internal bus
501 controller
502 communication management section
503 time management section
504 data table
505 buffer
601 vehicle control system
602 integrated recognition section
603 automatic drive controller
604 user input section
605 output management section
606 notification management section
607 abnormality detection section
608 switching section
609 motion controller
610 reconfiguration management section
611 reconfiguration execution section
612 relative information recognition section
613 relative information controller
614 automatic-driving-control-information holding section
801 control state monitoring section
802 control state determination section
803 information notification section
804 substitute program acquiring section
805 substitute program transmitting section
806 abnormal-state control determination section
810 substitute program receiving section
811 substitute program installation section
812 installation completion notification section
813 reconfiguration instruction receiving section
814 substitute program execution section
1000 user notification screen

The invention claimed is:

1. A processing system comprising:
a first processing device;
at least one processing device that is connected to the first processing device;
a substitute program transmitting section;
a substitute program receiving section, wherein
during a period in which the at least one processing device executes a control operation in accordance with a control program installed in the at least one processing device, the first processing device acquires a substitute program that substitutes for the control program, the substitute program is a program for executing a substitute operation when failure occurs, and the substitute program transmitting section transmits the substitute program to the substitute program receiving section at a priority that is lower than a priority of a control command;

additional processing devices which are connected to the at least one processing device via a network;

a substitute program acquiring section; and wherein during the period in which the at least one processing device executes the control operation, the additional processing devices acquire the substitute program, the substitute program acquiring section acquires the substitute program from one of the at least one processing device or the additional processing devices in which the reconfiguration management section is arranged, and the substitute program transmitting section transmits the substitute program, the substitute program is determined in accordance with a vehicle control state, and the reconfiguration management section is configured to confirm whether installation of the substitute program has been completed by checking for receipt of an installation completion notification in the vehicle control state.

2. The processing system according to claim 1, wherein in a case where execution of the substitute program is instructed, and installation of the substitute program is completed, the first processing device executes the substitute program, and in a case where the installation of the substitute program is not completed, the first processing device executes another substitute program.

3. The processing system according to claim 1, wherein the first processing device acquires the substitute program after carrying out safety maintenance control.

4. The processing system according to claim 1, wherein the first processing device is connected to the at least one processing device and another processing device, and during a period in which the at least one processing device executes the control operation, the at least one processing device transmits the substitute program to the another processing device.

5. The processing system according to claim 4, wherein in transmission of the substitute program after failure has occurred, a priority of transmission of the substitute program a higher priority than in a normal state, and the transmission is sent to the substitute program receiving section.

* * * * *